United States Patent
Lu et al.

(10) Patent No.: US 11,875,260 B2
(45) Date of Patent: Jan. 16, 2024

(54) REDUCING ARCHITECTURAL COMPLEXITY OF CONVOLUTIONAL NEURAL NETWORKS VIA CHANNEL PRUNING

(71) Applicant: ADOBE INC., San Jose, CA (US)

(72) Inventors: Xin Lu, Mountain View, CA (US); Zhe Lin, Fremont, CA (US); Jianbo Ye, State College, PA (US)

(73) Assignee: Adobe Inc., San Jose, CA (US)

( * ) Notice: Subject to any disclaimer, the term of this patent is extended or adjusted under 35 U.S.C. 154(b) by 1493 days.

(21) Appl. No.: 15/895,795

(22) Filed: Feb. 13, 2018

(65) Prior Publication Data
US 2019/0251441 A1    Aug. 15, 2019

(51) Int. Cl.
*G06N 3/082* (2023.01)
*G06N 3/048* (2023.01)

(52) U.S. Cl.
CPC ............ *G06N 3/082* (2013.01); *G06N 3/048* (2023.01)

(58) Field of Classification Search
CPC ............................. G06N 3/082; G06N 3/0481
See application file for complete search history.

(56) References Cited

U.S. PATENT DOCUMENTS

| | | | |
|---|---|---|---|
| 10,185,891 B1* | 1/2019 | Martin | G06V 10/82 |
| 2018/0114114 A1* | 4/2018 | Molchanov | G06N 3/04 |
| 2018/0137406 A1* | 5/2018 | Howard | G06N 3/0454 |
| 2018/0253647 A1* | 9/2018 | Yu | G06V 20/58 |
| 2018/0268284 A1* | 9/2018 | Ren | G06N 3/04 |
| 2020/0234130 A1* | 7/2020 | Yan | G06N 3/0454 |

OTHER PUBLICATIONS

Learning efficient convolutional networks through network slimming. Proceedings of the IEEE international conference on computer vision. 2017 (Year: 2017).*
He et al. ("Channel pruning for accelerating very deep neural networks." Proceedings of the IEEE international conference on computer vision. 2017) (Year: 2017).*
Ye, J., Lu, X., Lin, Z., & Wang, J. Z. (2018). Rethinking the Smaller-Norm-Less-Informative Assumption in Channel Pruning of Convolution Layers. arXiv preprint arXiv:1802.00124.

* cited by examiner

*Primary Examiner* — Li B. Zhen
*Assistant Examiner* — Moriam Mosunmola Godo
(74) *Attorney, Agent, or Firm* — Shook, Hardy & Bacon L.L.P.

(57) ABSTRACT

The architectural complexity of a neural network is reduced by selectively pruning channels. A cost metric for a convolution layer is determined. The cost metric indicates a resource cost per channel for the channels of the layer. Training the neural network includes, for channels of the layer, updating a channel-scaling coefficient based on the cost metric. The channel-scaling coefficient linearly scales the output of the channel. A constant channel is identified based on the channel-scaling coefficients. The neural network is updated by pruning the constant channel. Model weights are updated via a stochastic gradient descent of a training loss function evaluated on training data. The channel-scaling coefficients are updated via an iterative-thresholding algorithm that penalizes a batch normalization loss function based on the cost metric for the layer and a norm of the channel-scaling coefficients. When the layer is batch normalized, the channel-scaling coefficients are batch normalization scaling coefficients.

20 Claims, 8 Drawing Sheets

REDUCING ARCHITECTURAL COMPLEXITY OF CONVOLUTIONAL NEURAL NETWORKS VIA CHANNEL PRUNING

BACKGROUND

The supervised training of neural networks, such as convolutional neural networks (CNN), has shown great promise in enabling sophisticated machine learning (ML) technologies, such as machine vision and object recognition. Computational techniques, such as batch normalization (BN), have recently provided improvements to the training and deployment of neural networks. For instance, researchers have shown BN attenuate issues associated with covariant shifts of input data and vanishing gradients in the training stages, as well providing enhancements to the regularization of the model implemented by the neural network.

However, to be of value in many practical applications, such neural networks must be "deep." That is, for many applications, neural networks must include a significant number of layers. The model parameters (i.e., model weights) of a deep neural network indicate the strength of coupling between the neurons of adjacent layers and embed the "learned" knowledge that is inferred from training via labelled training data. Furthermore, layers of a network often include multiple channels. For example, the initial layer of a CNN may include three channels (RGB), while deeper layers may increase the numbers of channels by factors exceeding two or three orders of magnitude. The required computational resources (e.g., computation cycles, memory, and storage space) to compute with such neural networks increases supralinearly with each of the number of layers in a network, the number of channels in the layers, and the number of neurons in the channels of a layer. As such, the computational resources required for many useful neural networks are significant.

Accordingly, many ML researchers and technologists have attempted to reduce the architectural complexity of neural works. Conventional efforts to reduce neural network complexity have largely focused on generating sparse models to implement via neural networks. That is, conventional methods often constrain the model weights to be small or close to zero. For instance, some conventional methods for generating a more computationally efficient CNN attempt to sparsify convolution kernels (i.e., convolution filters) and/or feature maps by penalizing one or more norms of the model weights of the convolution kernels and/or feature maps in a training loss function. Other conventional methods zero-out some model weights by applying thresholds to model weights. The motivations for such conventional attempts to enforce sparsity on the model weights include various assumptions that are valid under the limited regime of convex learning problems. However, in many practical applications, training data give rise to nonconvex learning problems, under which such assumptions may break down. Furthermore, it is not clear under what circumstances thresholding model weights will negatively affect the performance of a neural network, or what objective guidelines may be employed to determine model weight thresholds. Thus, the performance of neural networks with enforced sparsity of model weights may suffer performance degradation.

Not all layers within a neural network affect the output equally. For instance, some layers may critically affect the performance of a neural network, while consuming only a small portion of available computational resources. Other layers may affect the overall performance, while consuming a significant portion of available resources. Thus, other conventional methods have attempted to prune layers or sparsify model weights in specific layers. However, there is often insufficient information available to target specific layers for pruning or sparsification, without sacrificing performance of the neural network.

SUMMARY

The present invention is directed towards reducing the architectural complexity of a neural network by selectively pruning (or removing) channels from convolution layers of the neural network. In various embodiments, a cost metric for a convolution layer is determined. The cost metric for the convolution layer indicates a computational resource cost per channel for the channels included in the convolution layer. Because the cost metric indicates a computational resource cost per channel for the channel, the cost metric may be a computation value, or a resource value (or simply a value), for the channel. The cost metric of a layer may be a computation metric of a computational cost of the layer. The neural network is trained. Training the neural network includes, for each channel of the convolution layer, updating a channel-scaling coefficient based on the cost metric for the convolution layer. The channel-scaling coefficient for a particular channel linearly scales the output of the particular channel. A constant channel included in the convolution layer is identified based on the updated channel-scaling coefficients for the channels. The neural network is updated by pruning (or removing) the identified constant channel from the convolution layer, such that the updated neural network is a channel-pruned neural network. During training of the neural network, model weights of the neural network are updated via a stochastic gradient descent (SGD) of a training loss function evaluated based on labeled training data. The channel-scaling coefficients may be updated via an iterative-thresholding algorithm (ISTA) that penalizes a batch normalization loss function based on the cost metric for the convolution layer and a norm of the channel-scaling coefficients. In various embodiments, the convolution layer is a batch normalized layer. In such embodiments, the channel-scaling coefficients are batch normalization scaling coefficients.

In some embodiments, the channel-scaling coefficient for each channel is scaled based on a hyper-parameter. The model weights for an upstream or subsequent convolution layer are also scaled based on the hyper-parameter. The neural network is trained based on the scaled channel-scaling coefficients of the convolution layer and the scaled model weights of the subsequent convolution layers. Upon training of the neural network, the channel-scaling coefficients and the model weights are re-scaled based on the hyper-parameter. In various embodiments, the removed constant channel is absorbed into the subsequent convolution layer based on whether the subsequent convolution layer is a batch normalized layer. In response to presence of padding in the convolution layer via the convolution operation, the channel-pruned neural network is re-trained (or tuned) based of a SGD of the training loss function.

When a convolution layer is not batch normalized, the model weights of the convolution layer may be transformed, such that the non-batch normalized convolution layer may be channel-pruned. For such convolution layers, the model bias coefficient for the channels may be removed and/or transformed. A scaling coefficient for each channel within the convolution layer may be determined based on a variance of a convolution of mini batches of training data. A batch normalization bias coefficient may be determined for each channel based on a mean of the convolution of the mini batches of the training data.

DETAILED DESCRIPTION

Due to their complex and highly coupled structure, the training and employment of conventional neural networks in machine learning applications requires significant computational resources. As such, the various embodiments herein are directed towards reducing the architectural complexity of deep neural networks (DNN). Conventional methods for reducing the architectural complexity of a DNN attempt to sparsify model weights and/or layers of a DNN. In contrast to such conventional methods, the various embodiments herein determine how the channels in the layers contribute to the overall information flow through the DNN, and remove (or prune) channels from individual layers that are less significant for the overall information flow. As discussed below, pruning channels that do not significantly contribute to the overall information flow reduces the architectural complexity of the DNN, without a significant impact on the performance of the DNN. In some scenarios, channel pruning increases the performance of the DNN. Accordingly, the various embodiments increase the efficiency and performance of a DNN, as well as the efficiency and performance of any computing devices implementing the channel-pruned DNN.

More specifically, in the various embodiments, a cost metric is determined for a particular layer in the neural network. The cost metric indicates a computational resource cost per channel for the channels included in the particular layer. Because the cost metric indicates a computational resource cost per channel for the channel, the cost metric may be a computation value, or a resource value (or simply a value), for the channel. The cost metric of a layer may be a computation metric of a computational cost of the layer. The neural network is trained via labeled training data. Training the network includes iteratively updating a channel-scaling coefficient for each channel included in the particular layer. A channel-scaling coefficient for a particular channel linearly scales an output of the particular channel. Updating a channel-scaling coefficient for the particular channel is based on the cost metric for the particular layer, as well as other factors discussed herein. Based on the updated channel-scaling coefficients for the channels, channels that provide constant output values independent of their input values (i.e., constant channels) are identified. The trained neural network is then updated to remove (or prune) the constant channels from the particular layer. As such, the updated neural network is a channel-pruned neural network. Although the above discussion contemplates pruning constant channels from a particular layer of the neural network, as discussed herein, channels in multiple layers of the neural network may be similarly pruned.

The channel-pruned layers may be convolution layers. Thus, the neural network may be convolutional neural network (CNN). Furthermore, the channel-pruned layers may be batch normalized (BN) layers. Accordingly, the channel-pruned layers may be batch-normalized convolution layers. In such embodiments, the channel-scaling coefficient for a channel may be a channel batch-normalization scaling coefficient.

In various embodiments, the channel-scaling coefficient for a particular channel in a particular layer may act as a "gate," controlling whether the information received at the particular channel in the particular layer (i.e., the particular channel's input) is processed and provided to subsequent layers in the network. More particularly, a deep neural network (DNN) may be conceptualized as a channel-to-channel computation graph, formed via the connections between the layers. Each channel is a node, and the inference dependencies are represented via directed edges between the channels. The channel-scaling coefficient for a particular channel within a particular layer (i.e., a particular node) functions as an information gate for the flow of information through the particular node. The "openness" of a particular gate determines the scale of the information that flows through the particular gate. If the particular gate is closed (i.e., the value of the channel-scaling coefficient is set to zero), then no, or at least insignificant amounts of, information flows through the particular gate and onto subsequent layers of the DNN.

The embodiments herein include an end-to-end training platform for training a DNN, wherein the training includes iteratively updating the channel-scaling coefficients for channels within at least a portion of the layers of the DNN. The training includes a bias toward closing information gates when the performance of the DNN does not significantly suffer. That is, the embodiments determine the channel-scaling coefficients, wherein a norm of the channel-scaling coefficients is penalized in a BN training loss function. The training of a DNN includes minimizing, or at least decreasing, the BN training loss function, as described herein. More particularly, when the value of a channel-scaling coefficient is zeroed, the output of the channel is a constant based on a BN bias coefficient of the channel. A constant signal is a high-entropy signal that carries no, or at least an insignificant amount of, information. Because the output of the channel is constant, the channel does not contribute to information flowing though the DNN. Thus, a constant channel may be pruned (or removed) from the DNN, and the BN bias coefficient of the constant channel may be absorbed into a subsequent layer, without a significant impact on the performance of the DNN.

In various embodiments, the model weights of the DNN are trained via conventional stochastic gradient descent (SGC) methods. The channel-scaling coefficients may be trained via various embodiments of iterative-thresholding algorithms (ISTA) as discussed herein. Briefly, an ISTA penalizes a norm of the channel-scaling coefficients in a BN loss function based on the cost metric for the layer.

The various embodiments herein may be applied to automatically determine a number of channels for each batch normalized convolution layer within an untrained DNN. That is, the embodiments may reduce the architectural complexity of a DNN, prior to training the DNN, via channel pruning. In other embodiments, the architectural of a pre-trained DNN may be reduced, without significant degradation of the performance, by pruning or removing channels from the pre-trained DNN. As discussed herein, in addition to increasing the computational efficiency, the performance of the pre-trained network may be enhanced via channel pruning. Also note that the various embodiments may be applied to one or more layers that are not batch normalized by applying appropriate transformations to the model weights.

In further contrast to conventional methods of reducing architectural complexity of a neural network, at least some of the embodiments herein do not introduce additional parameters into an existing or pre-trained DNN. At least some of the embodiments do not alter or modify the computation graph of an existing or pre-trained DNN. The channel pruning may be varied such that multiple DNNs for a single learning problem may be trained. Trade-offs between simplistic architecture and performance may be considered when deploying such trained DNNs. For instance, when deploying a DNN to hardware that includes a significant amount of resource, a DNN may be selected that includes more channels. In contrast, when deploying a DNN on hardware with limited computational resources, a more thoroughly channel-pruned version may be deployed.

Example Operating Environment

Figure 1:
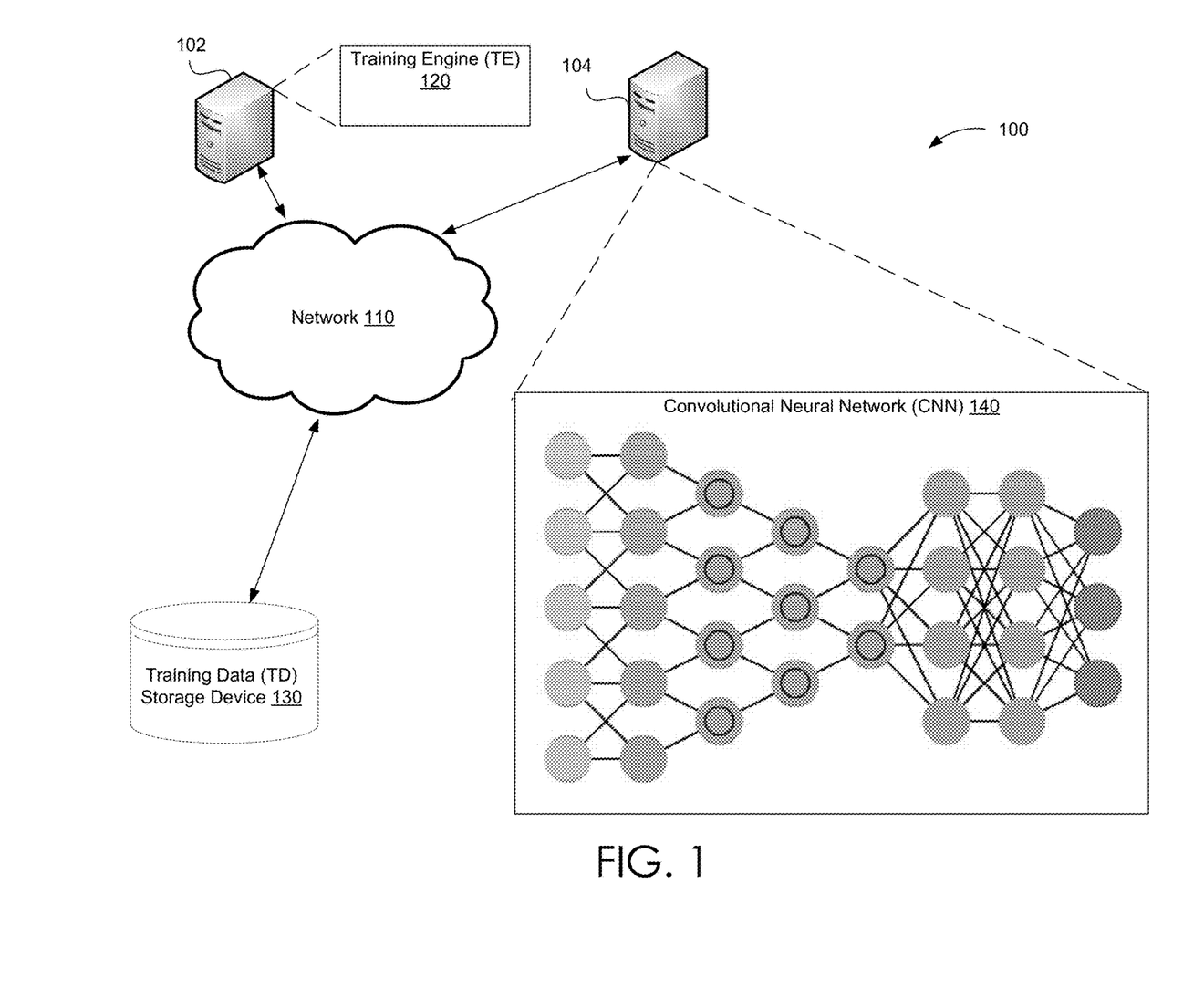
FIG. 1 illustrates a training system implementing various embodiments presented herein.

FIG. 1 illustrates a training system implementing various embodiments presented herein. Search system 100 includes one or more various computing devices, such as but not limited to training engine (TE) computing device 102 and neural network (NN) computing device 104. As shown in FIG. 1, TE computing device 102 hosts and/or implements training engine 120. NN computing device 104 hosts and/or implements one or more deep neural networks (DNN) such as but not limited to convolutional neural network (CNN) 140. Other embodiments of system 100 may include additional, alternative, and/or less computing devices. An exemplary, but non-limiting embodiment of a computing device is discussed in conjunction with at least computing device 700 of FIG. 7. That is, at least structures, functionalities, or features of computing device 700 may be included in any of computing devices 102 or 104. System 100 may include one or more storage devices, such as but not limited to training data (TD) storage device 130.

Figure 2:
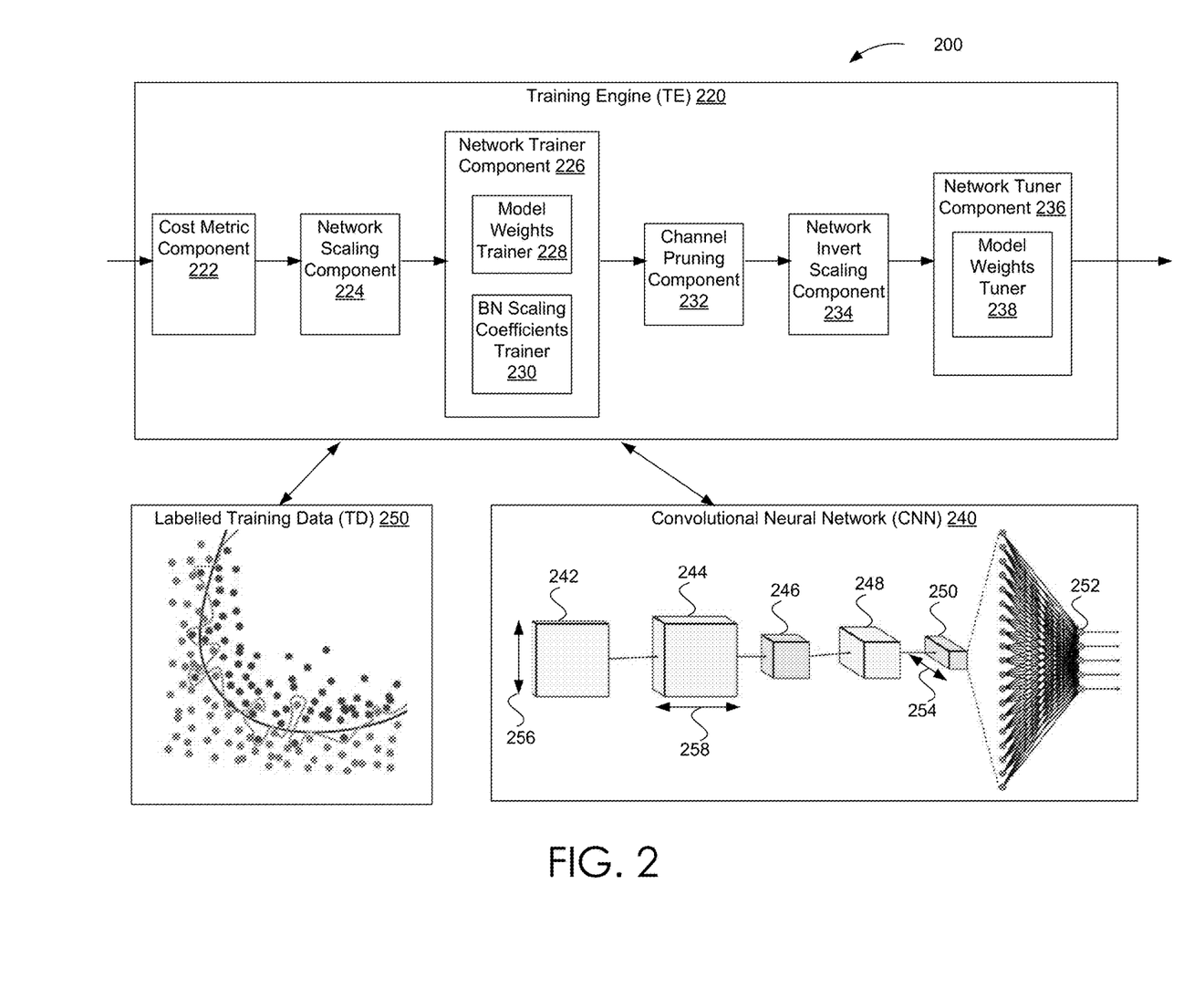
FIG. 2 illustrates one exemplary framework for training and reducing the architectural complexity of a convolutional neural network, via the various embodiments described herein.

Various embodiments of training engine 120 are discussed in conjunction with at least training engine 220 of FIG. 2. However, briefly here, training engine 120 is enabled to train and reduce the architectural complexity of a neural network, such as but not limited to CNN 140. More specifically, training engine 120 may train CNN 140 via training data included in TD storage device 1301, as well as prune or remove channels from CNN 140, as discussed herein.

A general or specific communication network, such as but not limited to communication network 110, may communicatively couple at least a portion of computing devices 102-104 and one or more storage devices, including but not limited to training data (TD) storage device 130. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to computing devices to exchange information via communication network 110.

TD storage device 130 may include volatile and non-volatile storage of digital data. TD storage device 130 may include non-transitory storage media. Communication network 110 may communicatively couple TD storage device 130 to at least a portion of computing devices 102-104. In some embodiments, TD storage device 130 may be a storage device distributed over multiple physical storage devices. Thus, TD storage device 130 may be a virtualized storage device. For instance, one or more "cloud storage" services and/or service providers may provide, implement, and/or enable TD storage device 130. A third party may provide such cloud services. Training data, such as but not limited to data used to train CNN 140, may be temporarily or persistently stored in TD storage device 130.

Generalized Framework for Pruning Channels in a Convolutional Neural Network

FIG. 2 illustrates one exemplary framework 200 for training and reducing the architectural complexity of a convolutional neural network (CNN) 240, via the various embodiments described herein. Framework 200 employs a training engine (TE) 220 to train and reduce the complexity of CNN 240, via labelled training data (TD) 250. TE 220 may be similar to TE 120 of FIG. 1. CNN 240 may be a pre-trained or an untrained CNN. CNN 240 may include one or more convolution layers. As shown in FIG. 2, CNN 240 includes five convolutions layers: 242, 244, 246, 248, and 250. One or more of convolution layers 242-250 may be batch-normalized convolution layers. CNN may also include one or more fully-connected layers (FCL), such as but not limited to FCL 252.

The width of a convolution layer, as indicated via arrow 254 for convolution layer 250, indicates a number of channels in the convolution layer. The other two spatial dimensions (as indicated via arrow 256 for convolution layer 242 and arrow 258 for convolution layer 244) indicates the size of the image (or other input data) received by the convolution layer. The arrows between the layers show the information flow through CNN 240. Deeper layers are subsequent to more shallow layers. For instance, each of convolution layers 244-250 is subsequent to convolution layer 242. Similarly, convolution layer 250 is subsequent to each of convolution layers 242-248. Convolution layer 242 is upstream from convolution layer 250. Convolution layer 248 is downstream from convolution layer 244. Generally, deeper layers are downstream from shallow layers. Convolution layer 248 is the follow-up, downstream-adjacent, or subsequent-adjacent layer of convolution 246.

In CNN 240, the size of the input dimensions tends to decrease in deeper layers, while the number of channels tends to increase in the deeper layer. For instance, FIG. 2 illustrates that the first convolution layer 242 may receive a relatively large 2D input image, that includes relatively few channels (e.g., three channels: RGB), while fifth convolution layer 250 receives a relatively small 2D input image with a significant number of channels. Upon training via TE 220, the width of one or more convolution layers 242-250 may be reduced via channel pruning.

TE 220 may employ at least three hyper-parameters: ρ, α, and μ_o. The functions of the hyper-parameters are described below. TE 220 may include a cost metric component 222, a network scaling component 224, a network trainer component 226, a channel pruning component 236, a network invert scaling component 234, and a network tuner component 236. An end-to-end workflow or pipe for training and reducing the architectural complexity of CNN 240 is shown via the arrows between the various components of TE engine 220.

Cost metric 222 is generally responsible for determining or calculating a cost metric for each of the layers to be channel-pruned in CNN 240. Network scaling component 224 is generally responsible for scaling the channel-scaling coefficients for each layer to be channel-pruned, as well as scaling the model weights for layers that are subsequent to the layers to be channel-pruned. Network trainer component 226 is generally responsible for training both the model weights and the channel-scaling coefficients of CNN 240. As such, network trainer component 226 includes a model weights trainer 228 and a BN scaling coefficients trainer 230. As discussed below, model weights trainer 228 may use a stochastic gradient descent (SGD) to train the model weights. BN scaling coefficients trainer 230 may use an iterative-thresholding algorithm (ISTA) to train the channel-scaling coefficients. Network trainer component 226 may employ TD 250 to train CNN 240. Channel pruning component 232 is generally responsible for identifying and pruning constant layers from CNN 240, based on the trained channel-scaling coefficients and the cost metrics for the layers. Channel pruning component 232 may further be responsible for updating layers in CNN 240 that are subsequent to channel-pruned layers to absorb the BN bias coefficients for pruned channels. Network invert scaling component 234 is generally responsible for re-scaling (or inverting) the scaling of channel-scaling coefficients and the model parameters, scaled via network scaling component 224. Network tuner component 236 is generally responsible for fine-tuning the training of the channel-pruned CNN 240. For instance, network tuner component 236 may employ TD 250 to tune the training of CNN 240.

More specifically, cost metric component 222 may determine the cost metric for each layer to be channel-pruned. In various embodiments, one or more of the convolution layers in CNN 240 may be selected for channel pruning. The cost metric for a particular layer indicates a computational resource (such as but not limited to memory) cost per channel for the channels included in particular layer. Because the cost metric indicates a computational resource cost per channel for the channel, the cost metric may be a computation value, or a resource value (or simply a value), for the channel. The cost metric of a layer may be a computation metric of a computational cost of the layer. The cost metric for each convolution layer may be determined via various expressions that indicate a ratio of a measure of the computational cost associated with a particular layer to the number of channels in the layer, prior to pruning of the channels. On exemplary, but non-limiting embodiment is as follows. For the l-th layer, the cost metric ($\lambda^l$) may be determined as follows, where l serves as a layer index for CNN 240:

$$\lambda^l = \frac{1}{l_w^i \cdot l_h^i} \left[ k_w^i \cdot k_h^i \cdot c^{l-1} + \sum_{l' \in \tau(l)} (k_w^{l'} \cdot k_h^{l'}) + l_w^l \cdot l_h^l \right],$$

where $l_w^i \cdot l_h^i$ is the size of the input data (such as an image) into the CNN, $k_w^l \cdot k_h^l$ is the size of the convolution kernel for the l-th layer, $k_w^{l'} \cdot k_h^{l'}$ is the size of the convolution kernel of the follow-up, downstream, or subsequent layer (l'), and τ(l) represents the set of follow-up, downstream, or adjacent layers, relative to the l-th layer, in CNN 240. Furthermore, $c^{l-1}$ indicates the channel size (i.e., the number of channels in a layer) of the previous (or upstream-adjacent) layer, over with the convolutions kernel for the l-th convolution layer operates over. Similarly, $c^{l'}$ denotes the channel size of follow-up, subsequent, or downstream layers. $l_w^l \cdot l_h^l$ represents the image size of the feature map of the l-th layer.

Regarding additional notation as used throughout, N may reference the CNN 240 and k may be employed as a channel index for a particular layer. As such, $W_k^l$ refers to the convolution kernel of the k-th channel of the l-th layer. For instance, $W_k^l$ may refer to a matrix, of which the matrix elements include the model kernel weights for the k-th channel of the l-th layer. $b_k^l$ refers to a vector that includes the model bias weights for the k-th channel of the l-th layer. The input image (or other 2D input data) of the k-th channel of the l-th layer may be referenced as $x_k^l$. Thus, if the l-th layer is not batch normalized, based on the transformation associated with the channel's convolution kernel and bias coefficients (i.e., model bias coefficients), the input of the l+1 layer (i.e., the output of the l-th layer) is determined as: $x_k^{l+1} = W_k^l * x_k^l + b_k^l$, where * represents the convolution operator. In the various embodiments, the channel index may be omitted and/or inferred. For example, notations such as $W^l$, $b^l$, and $x^l$ may be used throughout, with the understanding that these notations may refer to a specific channel within the l-th layer, or may refer to the set of channels within the l-th layer.

When the l-th layer is batch normalized, the batch normalization (BN) operator operates on each channel in the l-th layer. The BN operator ($BN_k^l$) for the k-th channel of the l-th layer is characterized via two coefficients: a batch-normalization (BN) scaling coefficient ($\gamma_k^l$) and a batch-normalized (BN) bias coefficient ($\beta_k^l$), i.e., $BN_k^l(x_k^l) = \gamma_k^l \cdot x_k^l + \beta_k^l$. The BN scaling coefficients and BN bias coefficients are determined by processing mini-batches of the training data. More specifically, the BN scaling coefficients and BN bias coefficients are based on the mean and variances of the processed mini batches of training data. If the l-th layer is batch normalized, the input of the l+1 layer is determined as: $x_k^{l+1} = BN(W_k^l * x_k^l + b_k^l)$. In view of the BN operator, a BN scaling coefficient linearly scales the output of the channel. Accordingly, a BN scaling coefficient may be referred throughout as a channel-scaling coefficient. Note that if $\gamma_k^l \approx 0.0$, then the k-th channel of the l-th layer is a constant channel with the value of the BN bias coefficient. A vector of the BN scaling coefficients of the l-th row may be referenced as $\gamma^l$, and a vector of the BN bias coefficients for the l-th layer may be referenced as $\beta^l$.

As discussed below, when training CNN 240, TE 220 determines and/or updates the channel-scaling coefficients (i.e., the BN scaling coefficients ($\gamma_t^l$)) for the various layers. Constant channels (i.e., $\gamma_k^l = 0.0$) are identified and pruned from CNN 240. Training the network additional includes determining the model weights ($W_k^l$, $b_k^l$), as well as the BN bias coefficients ($\beta_k^l$). Note that throughout, the model bias weights ($b^l$) are included and/or appended onto the convolution kernel weights ($W^l$), such that the notation $W^l$ includes the model weights ($W^l$, $b^l$). At least the determining of the model weights ($W^l$) may be based on a training loss function (l) throughout. Evaluation of the loss function is based on stochastic sampling of the training data. For instance, at least the model weights may be determined via a stochastic gradient descent (SGD) of l. That is, determining the model weights may be based on an iterative descent of $\nabla_W l$. To update the channel-scaling coefficients, an iterative-thresholding algorithm (ISTA) is applied that penalizes a batch normalization loss function that is based on the cost metric for the layers, a norm of the channel-scaling coefficients, and a term including a gradient of the training loss function, i.e., $\nabla_\gamma l$.

Network scaling component 224 scales the channel-scaling coefficients (e.g., the BN scaling coefficients) of each layer to be channel-pruned based on the hyper-parameter $\alpha$. In the various embodiments, as described below, the hyper-parameter $\alpha$ functions as a scaling hyper-parameter for the channel-scaling coefficients and the model weights. Network scaling component 224 additionally scales the model weights for each channel in the adjacent downstream (or adjacent subsequent or follow-up) convolution layer in CNN. More specifically, the scaling of the channel-scaling coefficients in the l-th layer and the models weights in the (l+1)-th layer are as follows:

$$\gamma^l := \alpha \gamma^l, W^{l+1} := \frac{1}{\alpha} W^{l+1}.$$

This scaling of the channel-scaling coefficients and model weights also scales the gradients $\nabla_\gamma l$ and $\nabla_{W^{l+1}} l$ by factors of $1/\alpha$ and $\alpha$ respectively, without changing the output of the (l+1) layer, i.e., $x^{l+2}$. Such scaling is useful for the convergence of the ISTA in the updating of the channel-scaling coefficients. Hyper-parameter $\alpha$ acts to tune a tradeoff for the convergence of the channel-scaling coefficients and the models weights. The larger the value of $\alpha$, the faster the convergence of the $\gamma^l$, relative to $W^{l+1}$.

Network trainer component 226 trains the CNN ($\mathcal{N}$). More specifically, network trainer component 226 includes a model weights trainer 228 and a BN scaling coefficients trainer 230. Model weights trainer 228 iteratively determines the model weights ($W^l$) via the stochastic gradient descent of $\nabla_W l$, where l is the training loss function. Evaluation of the loss function is based on sampling of TD 250. The BN scaling coefficients trainer 230 updates the BN scaling coefficients (i.e., the channel-scaling coefficients $\gamma^l$) based on an ISTA employing a batch normalization loss function ($l^{BN}$), as follows:

$$l_t^{BN} = \frac{1}{\mu_t} \|\gamma - \gamma_t + \mu_t \nabla_\gamma l_t\|^2 + \lambda \|\gamma\|_1,$$

where t is the index for iterative training steps. So $l_t^{BN}$ is the BN loss function at the t-th training step, $\lambda$ is the cost metric determined via cost metric, and $\mu_t$ is the learning rate at the t-th training step. The ISTA may dynamically update the learning rate at each training step, and the hyper-parameter $\mu_0$ indicates the initial learning rate. $l_t$ is the training loss function at the t-th training step (as determined via model weights trainer 228) and $\nabla_\gamma l_t$ is the gradient of the training loss function, with respect to the channel-scaling coefficients, and is estimated via mini batches of the training data.

The ISTA minimizes, or at least decreases, the value of the BN loss function at each training step. Accordingly, at the t+1 training step, BN scaling coefficients trainer 230 updates the values of the channel-scaling coefficients via the following minimization operation:

$$\gamma_{t+1} = \min_\gamma \left( \frac{1}{\mu_t} \|\gamma - \gamma_t + \mu_t \nabla_\gamma l_t\|^2 + \lambda \|\gamma\|_1 \right),$$

Note that the layer index has been omitted for clarity. The cost metric ($\lambda$) functions to scale the penalty that includes the $l_1$-norm of the channel-scaling coefficients. The above minimization operation may be solved via closed form as $\gamma_{t+1} = \text{prox}_{\mu_t \lambda}(\gamma_t - \mu_t \nabla_\gamma l_t)$, where $\text{prox}_\eta(x) = \max\{|x| - \eta, 0\} \cdot \text{sgn}(x).$ The training of $\mathcal{N}$ continues until the training loss function plateaus, the total sparsity of $\gamma^l$'s converges, and a least absolute shrinkage and selection operator (Lasso) converges. In various embodiments, the Lasso operator is as follows:

Lasso=$\rho \Sigma_l \lambda^l \|\gamma^l\|_1$, where the summation is over all layers to be channel-pruned and $\rho$ is a hyper-parameter of the various embodiments. Note that any channel, wherein the channel-scaling coefficient converges to 0.0 in the training of $\mathcal{N}$ is a constant channel and may be pruned within a significant reduction in the performance of $\mathcal{N}$.

Channel pruning component 232 identifies constant channels in the layers based on the trained values of the channel-scaling coefficients. That is, channels where the channel-scaling coefficients ($\gamma_k^l$) have converged to 0.0 via training by BN scaling coefficients trainer 230 are identified. Channel pruning component 232 prunes or removes those identified constant channels from the CNN. Channel pruning component 232 also updates subsequent layers in the CNN, such that the updated subsequent layers absorb the constant channels that have been pruned from the previous layers. More particularly, a follow-up or adjacent-downstream layer (l+1) of a channel-pruned layer (l) is updated to absorb the BN bias coefficient of a pruned channel in the channel-pruned layer. Absorbing the constant channels into subsequent layers is based on whether the subsequent layers is a batch normalized layer. As noted throughout, for the functionality of the CNN is to not be negatively affected, the BN bias coefficients or a pruned channel are absorbed into the (batch normalized or not batch normalized) subsequent layer. For the l-th BN convolution layer that is subject to a rectified linear unit (ReLU) and channel pruning, the output ($x^{l+1}$) based on the input ($x^l$) is determined as follows:

$x^{l+1} = \max\{\gamma^l \cdot \text{BN}_{\mu^l, \sigma^l, \epsilon^l}(W^l * x^l) + \beta^l, 0\}.$ If the follow-up convolution layer (l+1) is not batch normalized, then $x^{l+2} = \max\{W^{l+1} * x^{l+1} + b^{l+1}, 0\}.$ Thus, BN bias coefficients ($\beta^l$) for a pruned channel may be absorbed into the model bias terms ($b^{l+1}$) of the subsequent non-batch normalized layer (l+1) via the determination of a new model bias term ($b_{new}^{l+1}$) as follows:

$$b_{new}^{l+1} := b^l + I(\gamma = 0) \cdot ReLU(\beta)^T \text{sum\_reduced}(W^{l+1}),$$

such that $$x^{l+2} \approx \max\{W^{l+1} *_\gamma x^{l+1} + b^{l+1}_{new}, 0\},$$

where $*_\gamma$ denotes the convolution operator, where the convolutions are performed only along channels that include a non-zero value for the channel-scaling coefficient.

A similar determination is made when the subsequent convolution layer is batch normalized. When the l+1 layer is batch normalized, $$x^{l+2} = \max\{\gamma^{l+1} \cdot BN_{\mu^{l+1}, \sigma^{l+1}, \varepsilon^{l+1}}(W^{l+1} * x^{l+1}) + \beta^l, 0\}.$$

Rather than updating the model bias coefficients to absorb the BN bias coefficients of pruned channels in previous layers (as performed for non-batch normalized layers), the moving BN mean is updated to absorb the BN bias coefficients as follows:

$$\mu^{l+1}_{new} := \mu^l + I(\gamma = 0) \cdot ReLU(\beta)^T \text{sum\_reduced}(W^{l+1}),$$

such that $$x^{l+2} \approx \max\{\gamma^{l+1} \cdot BN_{\mu^{l+1}_{new}, \sigma^{l+1}, \varepsilon^{l+1}}(W^{l+1} *_\gamma x^{l+1}) + \beta^l, 0\}.$$

The above approximations ($\approx$) are strict equivalences (=), when the convolution operator ($*_\gamma$) does not employ padding. The updated channel-pruned CNN, where the pruned channels have been absorbed into subsequent layers is referenced as $\widetilde{\mathcal{N}}$.

The network invert scaling component 234 re-scales the trained (or updated) channel-scaling coefficients and model weights that were scaled by network scaling component 224 based on the hyper-parameter α. More specifically, invert scaling component performs the following inverting scaling operations:

$$\gamma^l := \frac{1}{\alpha}\gamma^l, \quad W^{l+1} := \alpha W^{l+1}.$$

The network tuner component 236 may re-tune and/or update the training of the channel-pruned CNN. In various embodiments, network tuner component 236 may include an model weights tuner 238 to employ the training data to perform a stochastic gradient descent of the training loss function, after the pruning of the channels, to tune the training of the CNN.

Figure 7:
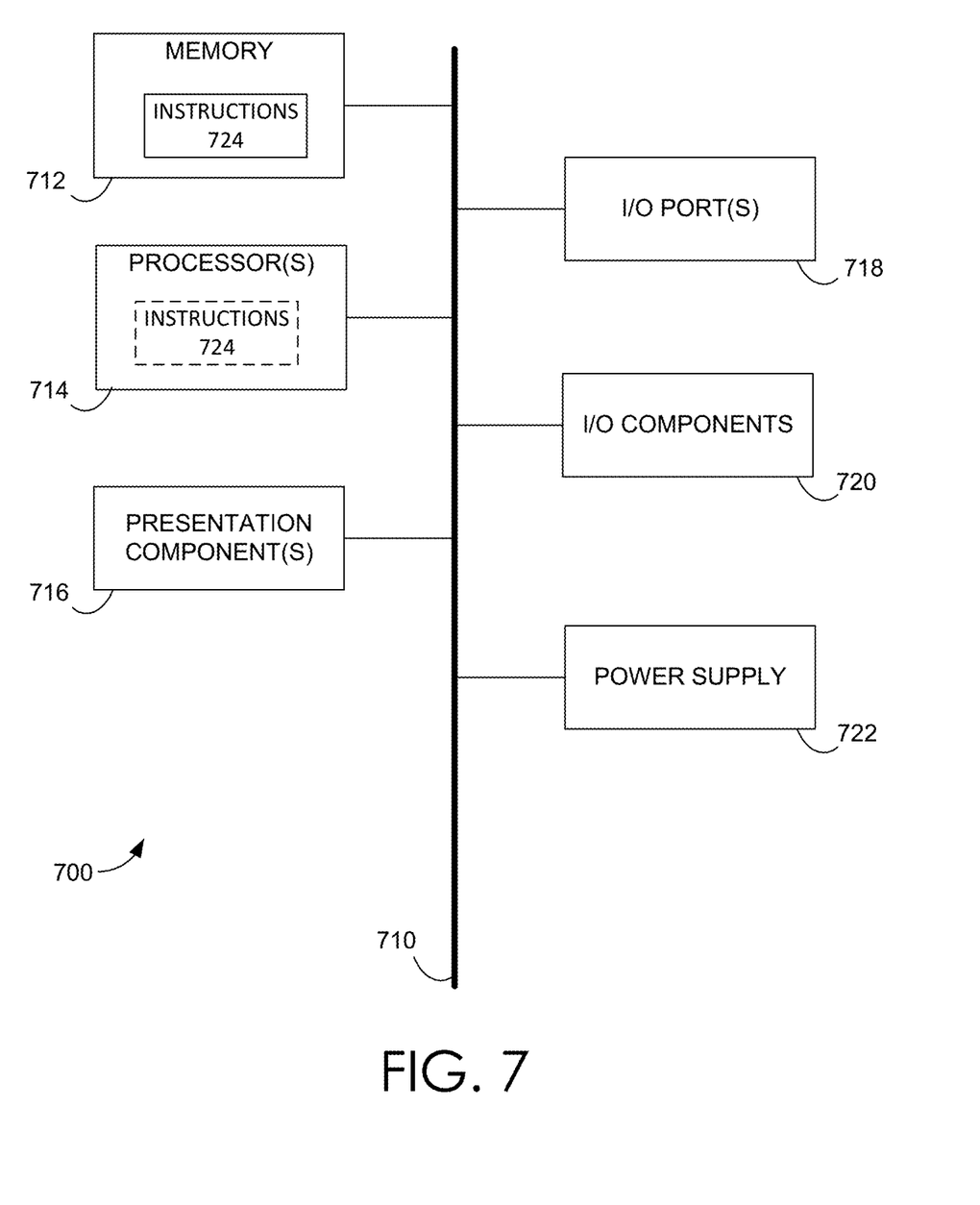
FIG. 7 is a block diagram of an example computing device in which embodiments of the present disclosure may be employed.

Generalized Processes for Reducing the Architectural Complexity of a Neural Network Processes 300-520 of FIG. 3-5B, or portions thereof, may be performed and/or executed by any computing device, such as but not limited to computing devices 102-104 of FIG. 1, as well as computing device 700 of FIG. 7. Additionally, training engine, such as but not limited to training engine 120 of FIG. 1 or training engine 220 of FIG. 2, may perform and/or execute at least portions of processes 300-500.

Figure 3:
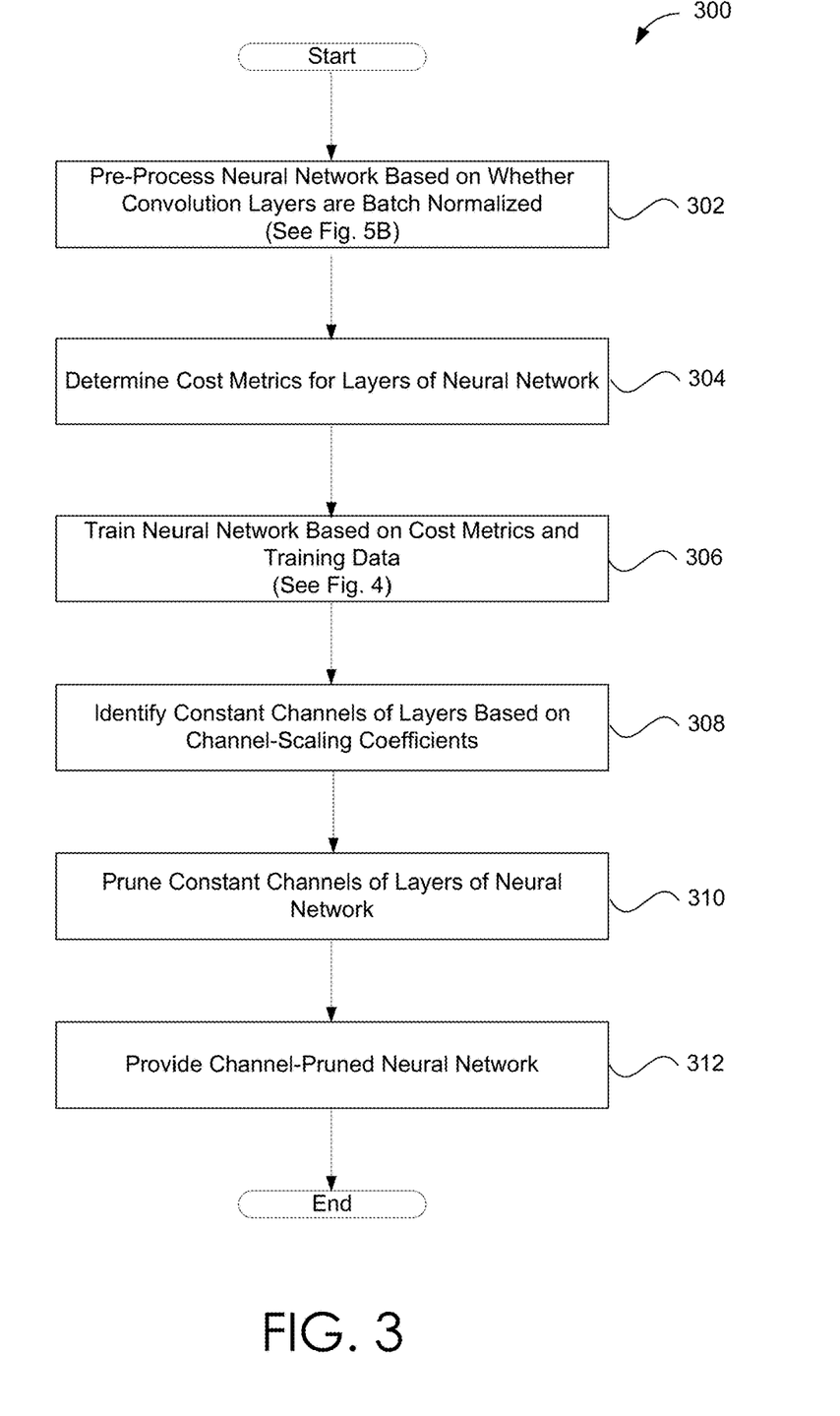
FIG. 3 illustrates one embodiment of an enhanced process flow for reducing the architectural complexity of a neural network that is consistent with the various embodiments presented herein.

FIG. 3 illustrates one embodiment of an enhanced process flow for reducing the architectural complexity of a neural network (NN) that is consistent with the various embodiments presented herein. Process 300 begins, after a start block, at block 302, where the NN is pre-processed based on whether the convolutional layers in the NN are batch normalized (BN). The NN may be a pre-trained or untrained NN. Various embodiments for pre-processing the NN discussed in conjunction with process 520 of FIG. 5B. However, briefly here, if a convolution layer of the NN was not originally trained with a BN operation, the model weights of NN may be transformed to transform the convolution layer into a BN layer. At block 304, a cost metric may be determined for each convolution layer of the NN. Various embodiments for determining a cost metric for a convolution layer are discussed in conjunction with cost metric component 222.

At block 306, the NN is trained based on the cost metrics and training data. Various embodiments of training a NN are discussed in conjunction with network scaling component 224, network trainer component 226, channel pruning component 232, and network invert scaling component 234 of FIG. 2, as well as process 400 of FIG. 4. However, briefly here, training the NN includes updating the channel-scaling coefficients for the channels in the convolution layers of the NN based on the cost metrics for the layers. As noted throughout, the channel-scaling coefficient for a channel may be a BN scaling coefficient for the channel and linearly scales an output of the channel.

At block 308, constant channels included in the convolution layers are identified based on the updated channel-scaling coefficients. For example, channel pruning component 232 of FIG. 2 may identify channels with constant output, as indicated by a zero-valued channel-scaling coefficient. At block 310, the identified constant channels are pruned (or removed) from the NN. In various embodiments, the channel pruning component 232 may update the trained NN by removing the constant channels form the layers, such that the updated NN is a channel-pruned NN. At block 312, the channel-pruned NN is provided. For example, the channel-pruned NN may be provided to NN computing device 104 of FIG. 1.

Figure 4:
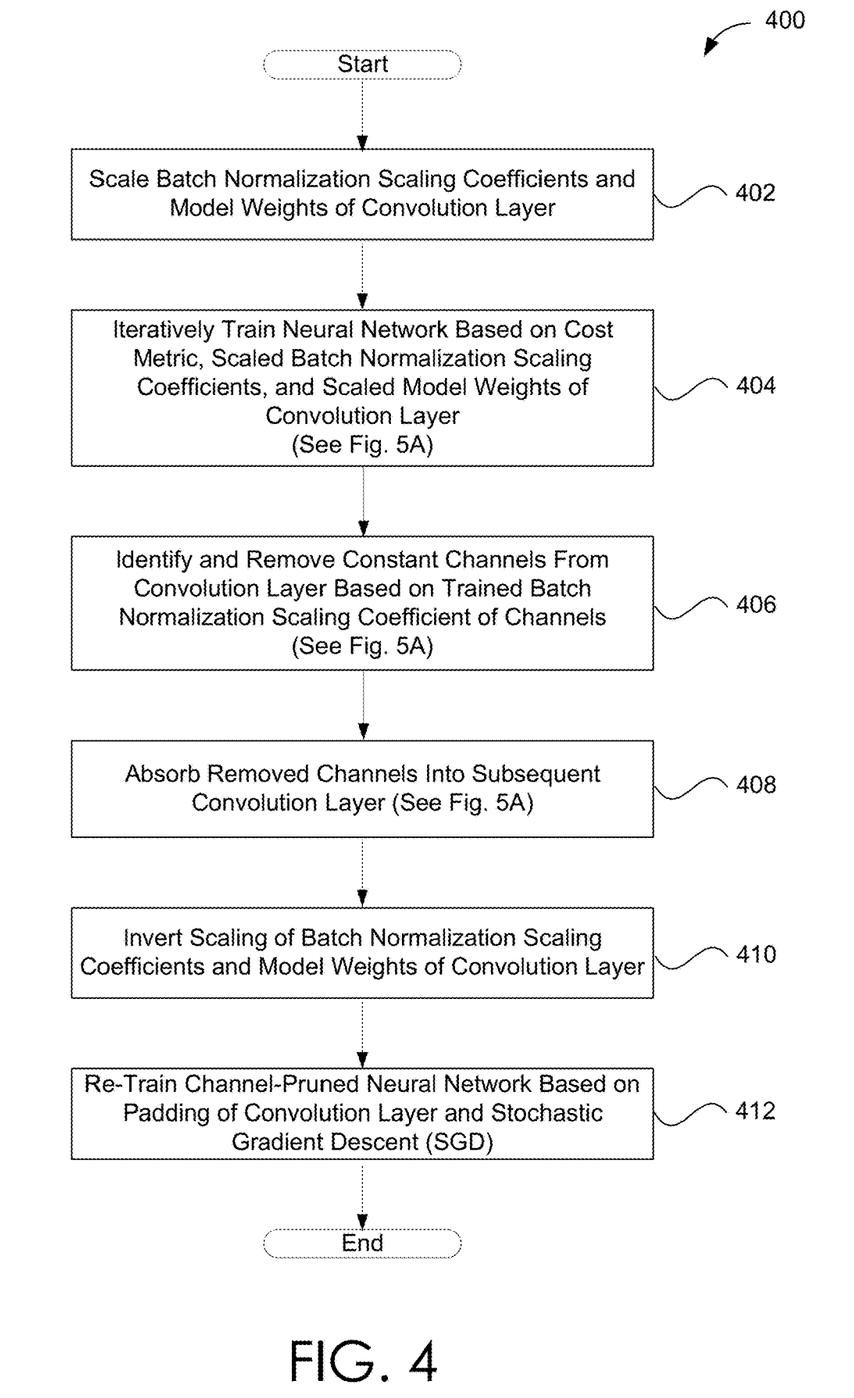
FIG. 4 illustrates one embodiment of another enhanced process flow for reducing the architectural complexity of a neural network that is consistent with the various embodiments presented herein.

FIG. 4 illustrates one embodiment of another enhanced process flow for reducing the architectural complexity of a neural network (NN) that is consistent with the various embodiments presented herein. Process 400 begins, after a start block, at block 402, batch normalization (BN) scaling coefficients (or channel-scaling coefficients) and model weights for a convolution layer in the NN are scaled based on a hyper-parameter. For instance, network scaling component 224 of FIG. 2 may scale the channel-scaling coefficient for the l-th convolution layer based on the hyper-parameter α. Network scaling component 224 may additionally scale the model weights of the subsequent (l+1) convolution layer based on the hyper-parameter α.

At block 404, the NN is iteratively trained based on the cost metrics (as determined via block 302 of FIG. 3), as well as the scaled BN scaling coefficients and model weights (as scaled via block 402). Various embodiments of iteratively training the NN are discussed in conjunction with network trainer component 226 of FIG. 2 and process 500 of FIG. 5A. However, briefly here, the model weights of the NN may be trained via stochastic gradient descent (SGD) of a training loss function. The BN scaling coefficients are updated via an iterative-thresholding algorithm (ISTA) that penalizes a batch normalization loss function based on the cost metrics and a norm of the BN scaling coefficients. At block 406, constant channels of the convolution layers are identified and removed based on the trained BN scaling coefficients of the channels. Various embodiments of identifying and removing constant channels are discussed in conjunction with at channel-pruning component 232 of FIG. 2 and process 500 of FIG. 5A.

At block 408, the removed channels are absorbed into subsequent convolution layers. Various embodiments of absorbing removed channels into subsequent convolution layers are discussed in conjunction with channel-pruning component 232 and process 500 of FIG. 5A. However, briefly here, absorbing the constant channel into the subsequent convolution layer is based on whether the subsequent convolution layer is a batch normalized convolution layer. At block 410, the scaling of the BN scaling coefficients and model weights of the convolution layers are inverted. Various embodiments of inverting the BN scaling coefficients and model weights is discussed in conjunction with at least network invert scaling component 234 of FIG. 2. However, briefly here, the BN scaling coefficients and models weights that were scaled via block 402 are re-scaled based on the hyper-parameter α. At block 412, the channel-pruned NN is re-trained (or tuned) based on padding of the convolution layer and SGD. Various embodiments for re-training the NN are discussed in conjunction with at least network turner component 236. However, briefly here, in response to padding in the convolution operations of a convolution layer, the channel-pruned NN may be re-trained based on SGD and a training loss function.

Figure 5A:
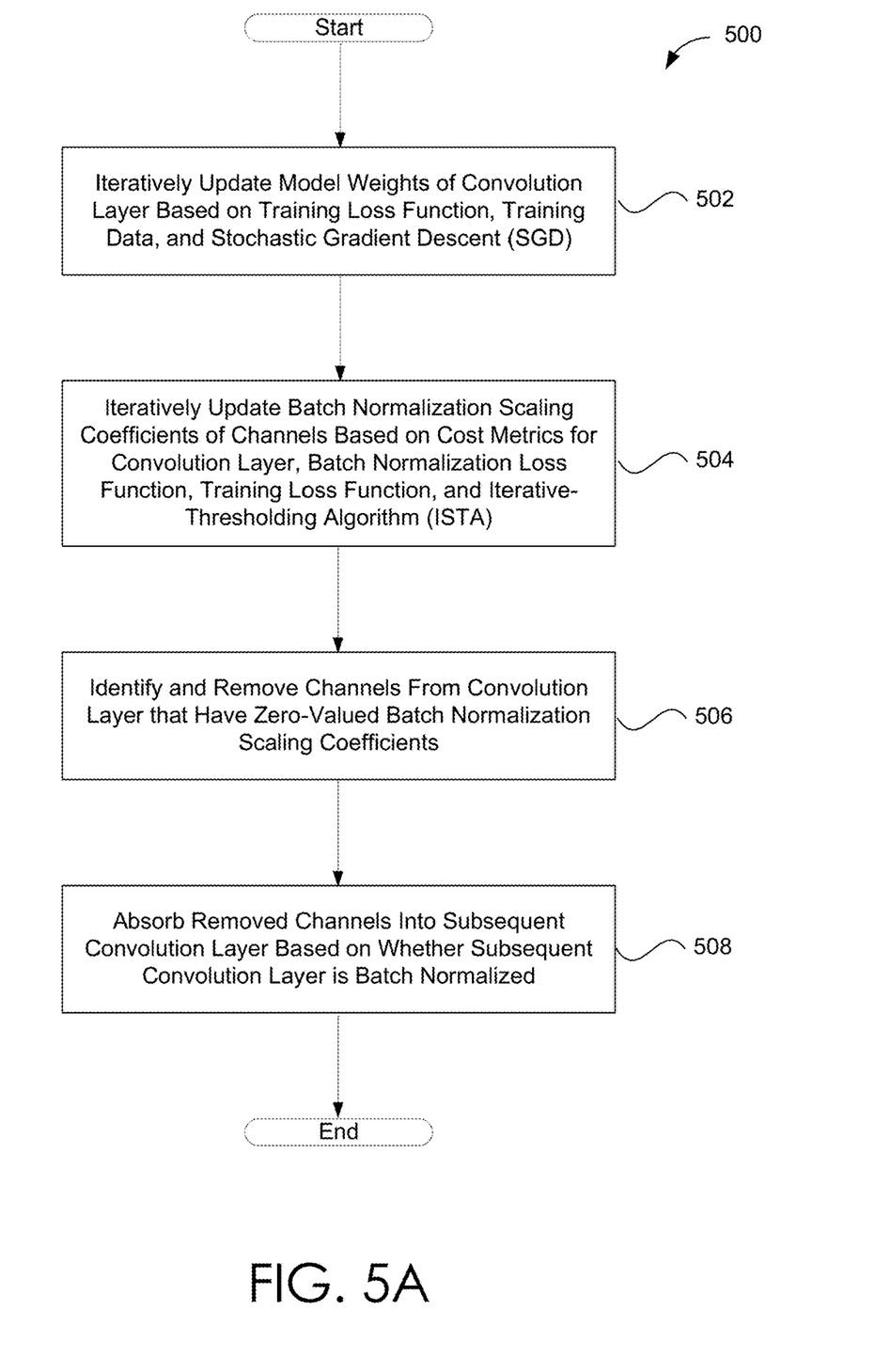
FIG. 5A illustrates one embodiment of an enhanced process flow for pruning channels from a convolution layer of a neural network that is consistent with the various embodiments presented herein.

FIG. 5A illustrates one embodiment of an enhanced process flow for pruning channels from a convolution layer of a neural network that is consistent with the various embodiments presented herein. Process 500 begins, after a start block, at block 502, model weights of the convolution layer are iteratively updated based on a training loss function (l), training data, and stochastic gradient descent (SGD). Various embodiments of iteratively updating model weights are discussed throughout, including at least in conjunction with network trainer component 226 and model weights trainer 228 of FIG. 2. At block 504, the BN scaling coefficients (or channel-scaling coefficients) are iteratively updated based on the cost metric for the convolution layer, a BN loss function ($l^{BN}$), the training loss function, and an iterative-thresholding algorithm (ISTA). Various embodiments for iteratively updating BN scaling coefficients are discussed in conjunction with at least network trainer component 226 and BN scaling coefficients trainer 230 of FIG. 2.

At block 506, channels in the convolution layer that have zero-valued BN scaling coefficients are identified and removed from the convolution layer. For instance, channel pruning component 232 may identify and remove constant channels from the convolution layer. At block 508, the removed channels are absorbed into the subsequent convolution layer based on whether the subsequent convolution layer is a batch normalized convolution layer. Various embodiments for absorbing the removed channels into subsequent layers are discussed in conjunction with at least channel pruning component 232.

Figure 5B:
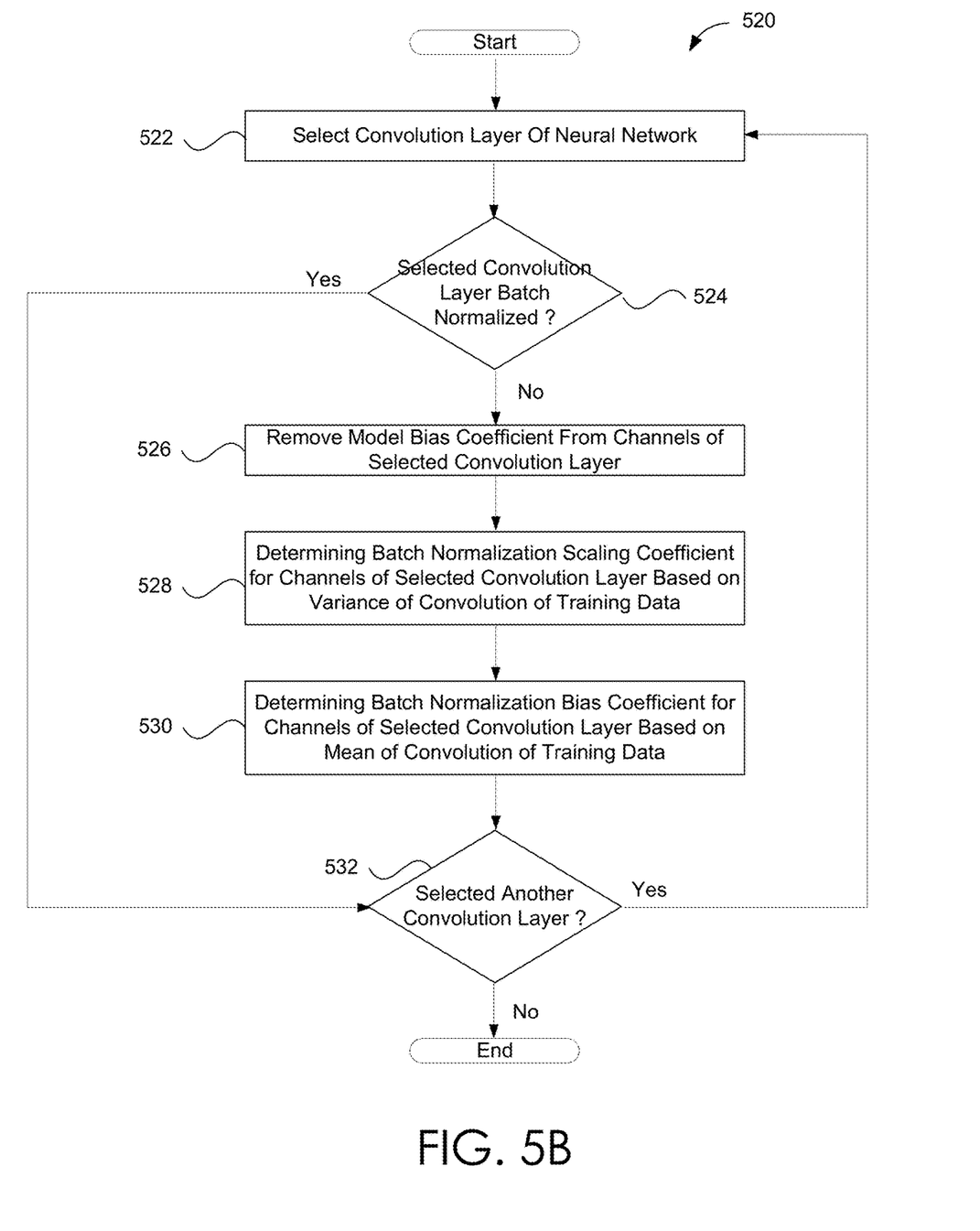
FIG. 5B illustrates one embodiment of an enhanced process flow for pre-processing a neural network based on whether convolution layers are batch normalized that is consistent with the various embodiments presented herein.

FIG. 5B illustrates one embodiment of an enhanced process flow for pre-processing a neural network (NN) based on whether convolution layers are batch normalized (BN) that is consistent with the various embodiments presented herein. Process 520 begins, after a start block, at block 522, where a convolution layer of the NN is selected for pre-processing. For instance, the l-th layer may be selected at block 522. At decision block 524, it is determined whether the selected convolution layer is batch normalized. If the selected convolution layer is batch normalized, process 520 flows to block 532. Otherwise, if the convolution layer is not batch normalized, then process 520 flows to process 526.

At block 526, the model bias coefficients ($b^l$) for the selected l-th convolution layer is removed from the model. At block 528, BN scaling coefficients ($\gamma^l$) for the channels of the selected convolution layer is determined based on variance of convolution of training data. For example, $\gamma^l = \sqrt{\sigma + \varepsilon}$. At block 530, BN bias coefficients ($\beta^l$) for the channels of the selected convolution layers are determined based on a mean of the convolution of the training data. For instance, $\beta^l = b^l + \mu$.

At decision block 532, it is determined whether to select another convolution layer for preprocessing. If another layer (e.g., the (l+1) convolution layer) is to be selected, process 520 returns to block 522. Otherwise, process 520 may terminate.

Experimental Results

Figure 6:
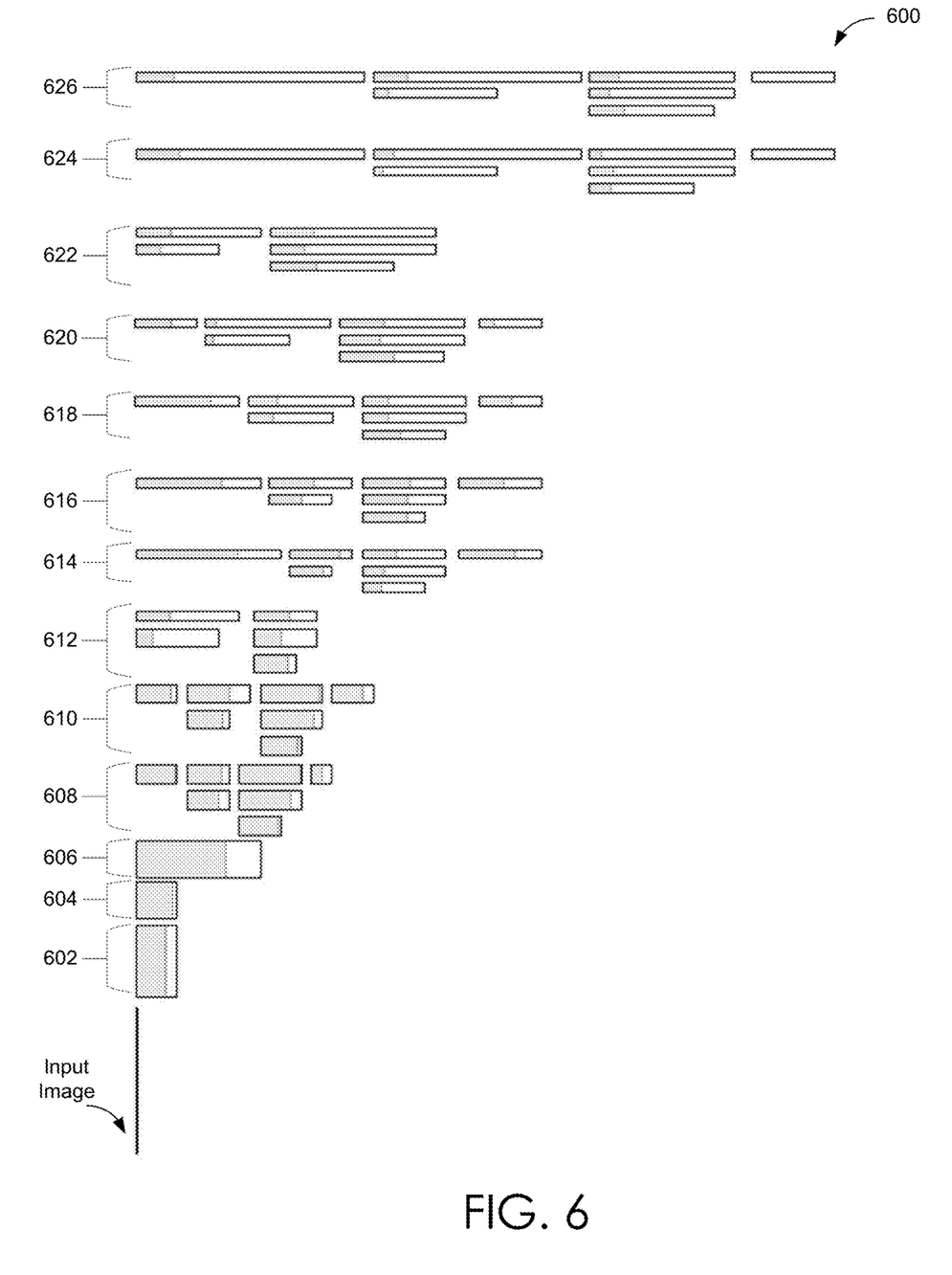
FIG. 6 illustrates a non-limiting example of results for pruning channels from a convolutional neural network that were obtained via the employment of various embodiments discussed herein.

FIG. 6 illustrates a non-limiting example of results for pruning channels from a convolutional neural network that were obtained via the employment of various embodiments discussed herein. More specifically, FIG. 6 includes a visualization of the number of pruned channels at each convolution layer in a CNN. Experimental results 600 show the reduction of the numerous channels in each convolution layer of a CNN. Results show thirteen (13) convolution layers in a CNN. The convolution layers are indicated as: 602, 604, 606, 608, 610, 612, 614, 616, 618, 620, 622, 624, and 626. Convolution layer 602 is the initial (or shallowest) convolution layer, while convolution layer 626 is the deepest convolution layer. Convolution layer 214 is a follow-up, or adjacent-subsequent, convolution layer to convolution layer 212. That is, if convolution layer 212 is the l-th layer, convolution layer 214 is the (l+1) layer. An input image for the CNN is also shown in FIG. 6. The vertical height of each convolution layer indicates the size of the feature map of the convolution layer. The horizontal width of the bars within a convolution layer indicate the number of channels in the convolution layer prior to channel-pruning. The horizontal width of the shaded portion of a bar indicates the number of channels remaining in the convolution layer after channel-pruning. A visual inspection of FIG. 6 reveals that most of the channels are pruned in the deeper layers of the CNN.

Illustrative Computing Device

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. Memory 712 may be non-transitory memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer storage medium having instructions stored thereon for providing a neural network, which, when executed by a processor of a computing device cause the computing device to perform actions comprising:
    determining a computation value for a first layer of the neural network, wherein the determination of the computation value for the first layer includes quantifying a computational resource cost for each channel included in the first layer such that the computational value indicate s a ratio of a measure of the computational resource cost associated with a particular layer to the number of channels in the layer;
    training the neural network including updating a channel-scaling coefficient for each channel of the plurality of channels via an iterative-thresholding algorithm that penalizes a batch normalization loss function based on the computation value for the first layer and a norm of the channel-scaling coefficient, wherein the channel-scaling coefficient for each channel linearly scales an output of each of the plurality of channels;
    identifying a constant channel of the plurality of channels based on the updated channel-scaling coefficient for the constant channel; and
    updating the trained neural network by removing the constant channel from the first layer, such that the updated neural network is a channel-pruned neural network.

2. The computer storage medium of claim 1, the actions further comprising:
    scaling the channel-scaling coefficient for each of the plurality of channels of the first layer based on a hyper-parameter;
    scaling each of a plurality of model weights associated with a second layer of the neural network that is subsequent to the first layer based on the hyper-parameter;
    training the neural network based on the scaled channel-scaling coefficients of the first layer and the scaled models weights of the second layer;
    re-scaling the channel-scaling coefficient for each of the plurality of channels of the first layer based on the hyper-parameter; and
    re-scaling each of the plurality of model weights associated with the second layer based on the hyper-parameter.

3. The computer storage medium of claim 1, wherein the first layer is a batched-normalized convolution layer of the neural network.

4. The computer storage medium of claim 1, wherein the actions further comprise:
    absorbing the constant channel of the first layer into a second layer of the neural network that is a convolution layer and subsequent to the first layer, wherein absorbing the constant channel is based on whether the second layer is batch normalized.

5. The one or more computer storage medium of claim 1, wherein training the neural network includes:
    updating model weights of the neural network based on a stochastic gradient descent (SGD) of a training loss function.

6. The one or more computer storage medium of claim 1, wherein the updated neural network is a channel-pruned neural network and the actions further comprise:
    in response to padding in the first layer, re-training the channel-pruned neural network based on stochastic gradient descent (SGD) of a training loss function.

7. The one or more computer storage media of claim 1, wherein the actions further comprise:
    in response to the first layer not being a batch norm layer, generating a batch norm layer by computing the channel-scaling coefficient and batch norm bias;
    determining the channel-scaling coefficient for each channel of the plurality of channels based on a variance of a convolution of training data for each channel of the plurality of channels; and
    determining a batch normalization bias coefficient for each channel of the plurality of channels based on a mean of the convolution of training data for each channel of the plurality of channels.

8. A method for providing a neural network, comprising:
    determining a computational cost for a first layer of the neural network, wherein the determination of the computation cost for the first layer includes quantifying a computational resource cost for each channel included in the first layer such that the computational value indicates a ratio of a measure of the computational resource cost at least associated with memory cost for a particular layer to the number of channels in the layer;
    training the neural network, wherein the steps for training the neural network includes updating a channel-scaling coefficient for each channel of the plurality of channels via an iterative-thresholding algorithm that penalizes a batch normalization loss function based on the computational cost of the first layer and a norm of the channel-scaling coefficient;
    identifying a constant channel of the plurality of channels based on the updated channel-scaling coefficient for the constant channel; and
    updating the trained neural network by removing the constant channel from the first layer.

9. The method for claim 8, further comprising:
    scaling the channel-scaling coefficient for each of the plurality of channels of the first layer based on a hyper-parameter;
    scaling each of a plurality of model weights associated with a second layer of the neural network that is subsequent to the first layer based on the hyper-parameter;
    training the neural network based on the scaled channel-scaling coefficients of the first layer and the scaled models weights of the second layer;
    re-scaling the channel-scaling coefficient for each of the plurality of channels of the first layer based on the hyper-parameter; and
    re-scaling each of the plurality of model weights associated with the second layer based on the hyper-parameter.

10. The method of claim 8, wherein the first layer is a batched-normalized convolution layer of the neural network.

11. The method of claim 8, further comprising:
absorbing the constant channel of the first layer into a second layer of the neural network that is a convolution layer and subsequent to the first layer, wherein absorbing the constant channel is based on whether the second layer is batch normalized.

12. The method of claim 8, further comprising:
updating model weights of the neural network based on a stochastic gradient descent (SGD) of a training loss function.

13. The method of claim 8, further comprising:
in response to padding in the first layer, re-training the channel-pruned neural network based on stochastic gradient descent (SGD) of a training loss function.

14. The method of claim 8, further comprising:
in response to the first layer not being a batch norm layer, generating the batch norm layer by computing the channel-scaling coefficient and batch norm bias;
determining the channel-scaling coefficient for each channel of the plurality of channels based on a variance of a convolution of training data for each channel of the plurality of channels; and
determining a batch normalization bias coefficient for each channel of the plurality of channels based on a mean of the convolution of training data for each channel of the plurality of channels.

15. A computing system, comprising:
a processor device; and
a computer-readable storage medium, coupled with the processor device, having instructions stored thereon, which, when executed by the processor device, provide the system with a training engine configured to train a neural network by performing actions comprising:
determining a cost metric for a first layer of the neural network, wherein the determination of the cost metric for the first layer includes quantifying a computational resource cost for each channel included in the first layer such that the computational value indicates a ratio of a measure of the computational resource cost associated with a particular layer to the number of channels in the layer;
training the neural network, wherein training the neural network includes updating a channel-scaling coefficient for each channel of the plurality of channels via an iterative-thresholding algorithm that penalizes a batch normalization loss function based on the cost metric of the first layer and a norm of the channel-scaling coefficient;
identifying a constant channel of the plurality of channels based on the updated channel-scaling coefficient for the constant channel; and
updating the trained neural network by removing the constant channel from the first layer, such that the updated neural network is a channel-pruned neural network.

16. The computing system of claim 15, the actions further comprising:
scaling the channel-scaling coefficient for each of the plurality of channels of the first layer based on a hyper-parameter;
scaling each of a plurality of model weights associated with a second layer of the neural network that is subsequent to the first layer based on the hyper-parameter;
training the neural network based on the scaled channel-scaling coefficients of the first layer and the scaled models weights of the second layer;
re-scaling the channel-scaling coefficient for each of the plurality of channels of the first layer based on the hyper-parameter; and
re-scaling each of the plurality of model weights associated with the second layer based on the hyper-parameter.

17. The computing system of claim 15, the actions further comprising:
absorbing the constant channel of the first layer into a second layer of the neural network that is a convolution layer and subsequent to the first layer, wherein absorbing the constant channel is based on whether the second layer is batch normalized.

18. The computing system of claim 15, the actions further comprising:
updating model weights of the neural network based on a stochastic gradient descent (SGD) of a training loss function.

19. The computing system of claim 18, the actions further comprising:
in response to padding in the first layer, re-training the channel-pruned neural network based on stochastic gradient descent (SGD) of a training loss function.

20. The computing system of claim 15, the actions further comprising:
in response to the first layer not being a batch norm layer, generating the batch norm layer by computing the channel scaling coefficient and batch norm bias;
determining the channel-scaling coefficient for each channel of the plurality of channels based on a variance of a convolution of training data for each channel of the plurality of channels; and
determining a batch normalization bias coefficient for each channel of the plurality of channels based on a mean of the convolution of training data for each channel of the plurality of channels.

* * * * *